(12) United States Patent
Tanaka et al.

(10) Patent No.: US 6,392,728 B2
(45) Date of Patent: May 21, 2002

(54) LCD WITH COLOR FILTER SUBSTRATE WITH TAPERING COLOR FILTER PORTIONS OVERLAPPED BY ELECTRODE AND BLACK MATRIX LAYERS

(75) Inventors: Keiichi Tanaka, Tenri; Tomohiko Yamamoto, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/736,372

(22) Filed: Dec. 15, 2000

Related U.S. Application Data

(62) Division of application No. 09/199,408, filed on Nov. 25, 1998, now Pat. No. 6,208,394.

(30) Foreign Application Priority Data

Nov. 27, 1997 (JP) .............................. 9-326016
Sep. 14, 1998 (JP) ............................. 10-260672

(51) Int. Cl.[7] ............................................. G02F 1/1335
(52) U.S. Cl. ........................................ 349/106; 349/110
(58) Field of Search ................................ 349/106, 110, 349/108, 111

(56) References Cited

U.S. PATENT DOCUMENTS

| | | | |
|---|---|---|---|
| 4,587,038 A | | 5/1986 | Tamura |
| 4,600,273 A | | 7/1986 | Ohno |
| 4,818,981 A | * | 4/1989 | Oki et al. .................. 340/784 |
| 4,935,757 A | | 6/1990 | Hatano et al. |
| 5,212,575 A | * | 5/1993 | Kojima et al. ................ 359/82 |
| 5,328,728 A | | 7/1994 | Swirbel et al. |
| 5,369,512 A | * | 11/1994 | Yanai et al. ................... 359/59 |
| 5,636,042 A | * | 6/1997 | Nakamura et al. ........... 349/123 |
| 5,684,553 A | * | 11/1997 | Fukuchi ....................... 349/110 |
| 5,689,318 A | * | 11/1997 | Matsuyama et al. ......... 349/106 |
| 5,721,599 A | * | 2/1998 | Cheng ........................ 349/106 |
| 5,742,365 A | * | 4/1998 | Seo .............................. 349/43 |
| 5,757,452 A | * | 5/1998 | Masaki et al. ............... 349/110 |
| 5,850,271 A | * | 12/1998 | Kim et al. ................... 349/111 |
| 5,861,928 A | * | 1/1999 | Sekiguchi ..................... 349/49 |
| 6,208,394 B1 | * | 3/2000 | Tanaka et al. ............... 349/106 |

FOREIGN PATENT DOCUMENTS

| | | |
|---|---|---|
| JP | 62133478 | 6/1987 |
| JP | 62192726 | 8/1987 |
| JP | 1-138530 | 5/1989 |
| JP | 7-253587 A | 10/1995 |

OTHER PUBLICATIONS

Patent Abstracts of Japan, No. 05249494, Sep. 28, 1993, "Liquid Crystal Display Device"; Sony Corp.; Sato Takuo et al.
Patent Abstracts of Japan, No. 07020497, Jan. 24, 1995, "Active Matrix Liquid Crystal Display Device"; Sony Corp.; Noda Kazuhiro et al.
Patent Abstracts of Japan, No. 06082795, Mar. 25, 1994, "Liquid Crystal Device And Its Manufacture", Seiko Epson Corp.; Momose Shinya.
Patent Abstracts of Japan, No. 08328020, Dec. 13, 1996, "Production of Liquid Crystal Display Element and Device Therefor"; Sony Corp.; Ochi Tetsuro.

* cited by examiner

*Primary Examiner*—Toan Ton
*Assistant Examiner*—Andrew Schechter
(74) *Attorney, Agent, or Firm*—Nixon & Vanderhye P.C.

(57) ABSTRACT

An LCD is provided, the LCD including a color filter substrate with tapering color filter portions overlapped by electrode and/or black matrix layers. The other substrate (e.g., active matrix substrate) may include pixel electrodes, address lines, and switching elements.

4 Claims, 11 Drawing Sheets

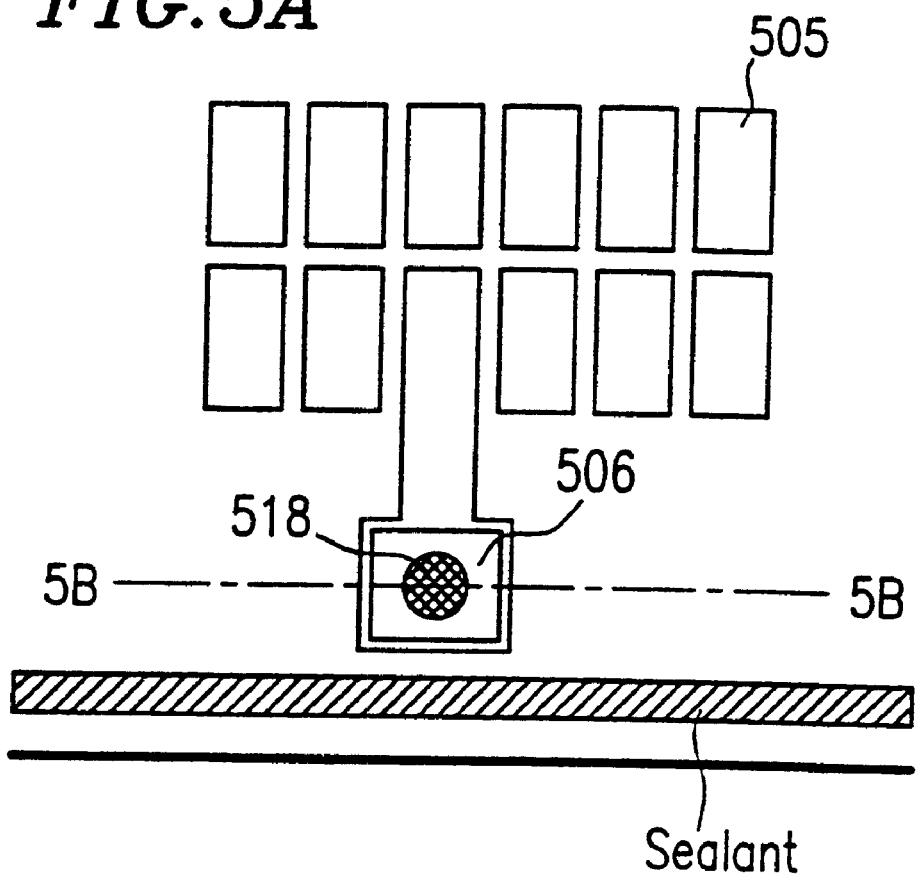
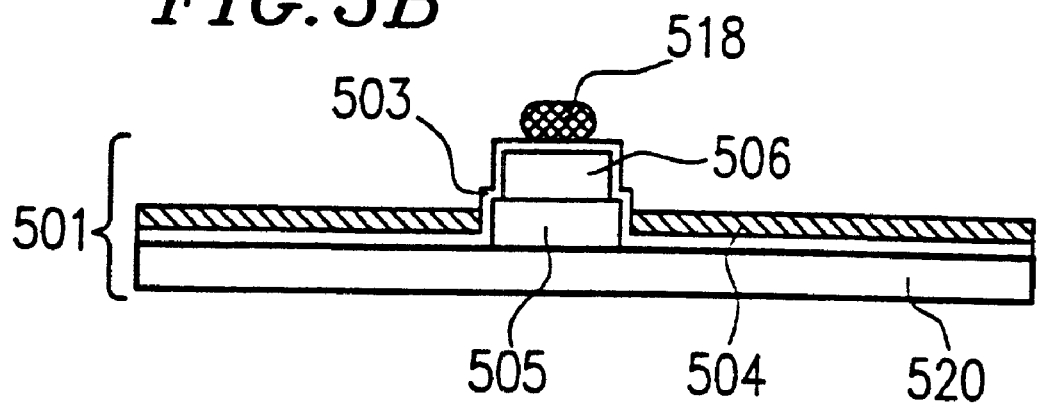

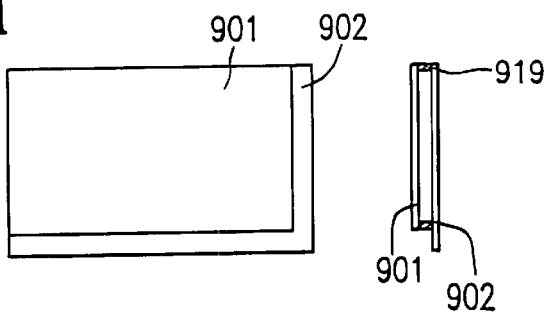
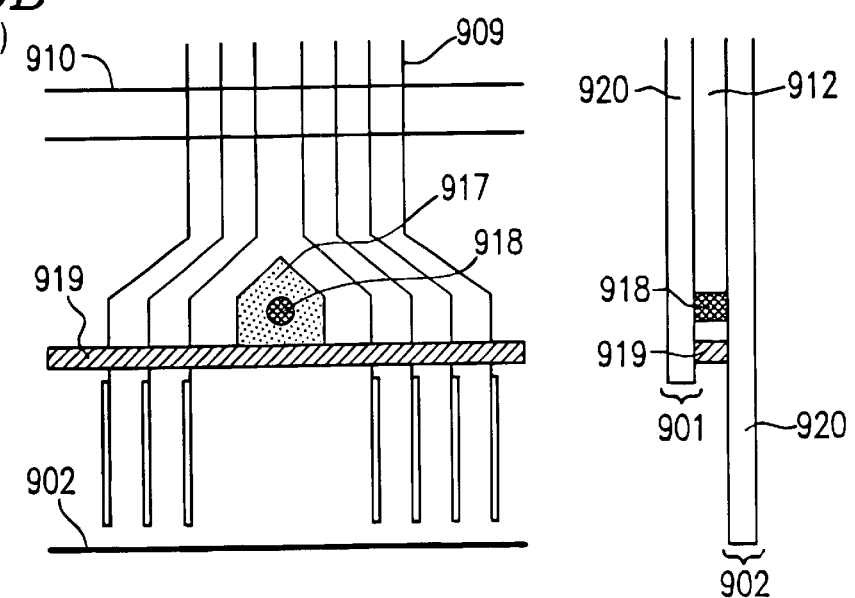
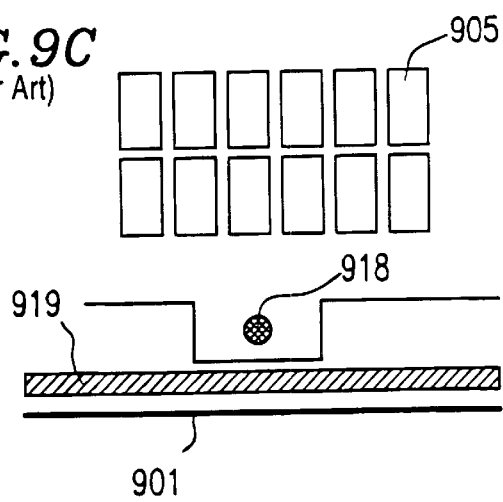
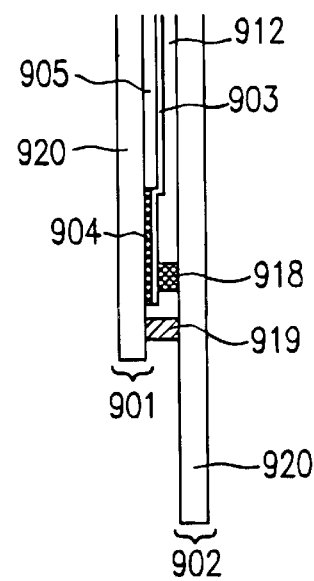
FIG. 9A (Prior Art)
FIG. 9B (Prior Art)
FIG. 9C (Prior Art)

US 6,392,728 B2

1

LCD WITH COLOR FILTER SUBSTRATE WITH TAPERING COLOR FILTER PORTIONS OVERLAPPED BY ELECTRODE AND BLACK MATRIX LAYERS

This application is a Divisional of U.S. application Ser. No. 09/199,408, filed Nov. 25, 1998 now U.S. Pat. No. 6,208,394.

BACKGROUND OF THE INVENTION

1. Field of the Invention

The present invention relates to a liquid crystal display device used for displays of office automation apparatuses, audio and video apparatuses, and the like, and a method for fabricating such a liquid crystal display device.

2. Description of the Related Art

A conventional transistor-type active matrix driven liquid crystal display device will be described with reference to FIGS. 6A and 6B, as the first prior art example. FIG. 6A is a perspective view of the conventional liquid crystal display device, and FIG. 6B is a sectional view taken along line 6B—6B of FIG. 6A.

Referring to FIG. 6B, the conventional liquid crystal display device includes a first substrate 601 (hereinbelow, referred to as a counter substrate) and a second substrate 602 (hereinbelow, referred to as an active matrix substrate) disposed to face each other with a predetermined gap therebetween. A liquid crystal layer 612 is provided between the substrate 601 and 602. Referring to FIG. 6A, the active matrix substrate 602 includes: a plurality of parallel source bus lines 609 and a plurality of parallel gate bus lines 610 which are formed on the surface of a glass substrate 620 facing the liquid crystal layer 612; and thin film transistors (TFTs) 611 disposed at the respective crossings of the source bus lines 609 and the gate bus line 610. Pixel electrodes 608 are formed on the surface of the glass substrate 620 facing the liquid crystal layer 612 and connected to drain electrodes of the corresponding TFTs 611. A voltage is applied to each of the pixel electrodes 608 for controlling the orientation direction of liquid crystal molecules in the liquid crystal layer 612.

Referring to FIG. 6B, the counter substrate 601 includes: a plurality of colored portions 605 on the surface thereof facing the liquid crystal layer 612 at positions corresponding the pixel electrodes 608 of the active matrix substrate 602; and a counter electrode 603 formed covering the colored portions 605. A black matrix (BM) layer 604 made of a light-blocking material is disposed to fill gaps between the adjacent colored portions 605.

Hereinbelow, a color filter layer as used herein will be described. For example, when pixels are arranged in a stripe shape, stripe-shaped colored portions of red (R), green (G), and blue (B) are arranged cyclically in parallel. A color layer is composed of a plurality of stripe-shaped colored portions of a single color corresponding to respective pixel electrodes. Such color layers constitute a color filter layer. The color filter layer as used herein does not include the BM layer formed between the adjacent colored portions. Herein, a region of the liquid crystal display device defined by each of the pixel electrodes is called a pixel region.

Referring back to FIGS. 6A and 6B, in the conventional liquid crystal display device, a scanning signal voltage is sequentially applied to the gate bus lines 610 so as to switch on the TFTs 611 connected to the respective gate bus lines 601, thereby allowing a specific display signal voltage to be

2 written in each of the pixel electrodes 608 and held for a certain time period. The liquid crystal layer 612 interposed between the substrate 601 and 602 is driven with the potential difference between the voltage at each of the pixel electrodes 608 and a counter voltage applied to the counter electrode 603.

Two exemplary methods normally used for fabricating the counter substrate having a plurality of colored portions as described above will be described with reference to FIGS. 7A to 7E and 8A to 8E. FIGS. 7A and 8A are flow charts showing normal fabrication steps for the counter substrate having colored portions. FIGS. 7B to 7D and 8B to 8D are plan views, together with corresponding sectional views, at the respective fabrication steps. FIGS. 7E and 8E are sectional views of the respective complete counter substrates.

Herein, a normal dry film fabrication method will be described with reference to FIGS. 7A and 7E. A resin film (dry film) having red (R) pigments dispersed therein is laminated to a glass substrate 720, followed by steps such as exposure to light, development, and baking, to form an R color layer composed of a plurality of stripe-shaped R colored portions 705.

A dry film having (G) pigments dispersed therein is then laminated to substantially the entire top surface of the substrate covering the R colored portions 705. This is followed by steps such as exposure to light, development, and baking, to form a G color layer composed of a plurality of stripe-shaped G colored portions 706.

A B color layer composed of a plurality of stripe-shaped B colored portions 707 is then formed by repeating the process for the R colored portions 705 and the G colored portions 706 described above. Thus, a color filter layer composed of the R, G, and B three-color layer is completed. The colored portions are formed so as to correspond to respective rows of pixel electrodes.

Referring to FIG. 7E, after the formation of the color filter layer, a dry film having carbon particles dispersed therein is laminated to the resultant substrate. Using the color filter layer composed of the colored portions as a mask, the back surface of the substrate is exposed to light, followed by development and baking, to form a BM layer 704 for light-blocking the regions where the colored portions of the color filter layer are not formed. ITO is then deposited over the entire top surface of the resultant substrate to form a counter electrode 703. Thus, a counter substrate 701 is fabricated. As the BM layer, a metal film may also be used as shown in FIG. 8B as a metal BM film 804.

FIGS. 8A to 8E illustrate a fabrication process of the counter substrate by a spin coat method. Resin materials having color pigments dispersed therein are applied to substantially the entire top surface of a glass substrate 820 by spin coating, to form R, G, and B colored portions 805, 806, and 807, so as to fabricate a counter substrate 801.

Hereinbelow, a common transfer portion formed in a conventional liquid crystal display device such as described above will be described with reference to FIGS. 9A to 9C. The common transfer portion as used herein refers to a portion for securing an electrical connection between the counter substrate and the active matrix substrate to be used as a terminal formed on the active matrix substrate for applying a voltage to the counter electrode.

FIG. 9A is a plan view, together with a corresponding sectional view, of a conventional liquid crystal display device. FIG. 9B is a plan view, together with a corresponding sectional view, illustrating a common transfer portion of an active matrix substrate 902 of the conventional liquid crystal display device. In FIG. 9B, the reference numerals 909 and 910 denote source bus lines and gate bus lines, respectively. FIG. 9C is a plan view, together with a corresponding sectional view, illustrating a common transfer portion of a counter substrate 901 of the conventional liquid crystal display device. In FIG. 9C, the reference numeral 905 denotes colored portions.

Referring to FIG 9B, the active matrix substrate 902 includes a common transfer electrode 917 formed between adjacent source driver connection blocks in a source terminal extension portion. The common transfer electrode 917 is connected to a common line at a position on the periphery of the display panel, and is electrically connected with a counter electrode 903 (FIG. 9C) of the counter substrate 901 via carbon paste 918. The number of such common transfer electrodes 917 formed for one display panel may be appropriately determined depending on the definition level of the panel, the size of the panel, the difference in resistance from the transparent counter electrode, and the like. For example, for a panel equivalent to Type 10 VGA, about four to eight common transfer electrodes are normally provided.

Referring to FIG. 9C, in the counter substrate 901, ITO is deposited using a mask so that an ITO portion 903 is formed on the area of the counter substrate 901 corresponding to the common transfer electrode 917 of the active matrix substrate 902, so that the ITO portion 903 comes into contact with the carbon paste 918 of the active matrix substrate 902. The resultant connection portion of the counter substrate 901 has a structure of a glass substrate 920/a BM layer 904/the ITO portion 903/the carbon paste 918 formed in this order. Alternatively, ITO may be formed over the entire surface of the counter substrate 901, instead of masking. In this case also, the same structure as described above is obtained.

The counter substrate 901 and the active matrix substrate 902 fabricated as described above are placed to face each other with a predetermined gap therebetween. While a sealer 919 is provided between the substrate 901 and 902 along the periphery thereof, a liquid crystal material is injected into the gap between the substrates 901 and 902 so as to be sealed to form a liquid crystal layer 912. The liquid crystal display device is thus fabricated. When a twisted nematic (TN) liquid crystal material is used for the liquid crystal layer, the gap between the substrates 901 and 902 is normally set at about 4 to 5 μm. Such a gap is realized by dispersing dielectric beads having a diameter of about 4.5 to 7 μm over the entire surface of either the counter substrate 901 or the active matrix substrate 902. Such dielectric beads are dispersed in an unspecific manner over the entire surface of the substrate including the portions above the pixel electrodes as long as no aggregation or the like is generated.

In the first prior art example described above, as shown in FIG. 6B, the source bus line 609 and the counter electrode 603 form a capacitance component therebetween with only the liquid crystal layer 612 existing therebetween. Therefore, if a capacitance coupling is formed between the source bus line 609 charged with a signal and the counter electrode 603, a signal display may be generated on the source bus line 609, generating a difference in write voltage between the signal input terminal and the signal non-input terminal of the source bus line 609. This reduces the display quality of the liquid crystal display device.

Another problem is as follows. Each of the pixel electrodes 608 is influenced by an electric field from not only the portion of the counter electrode 603 located right above the pixel electrode 608, but the entire counter electrode 603. This influence of the electric field from the counter electrode 603 will be described with reference to FIG. 6B. Liquid crystal molecules located near a point B on the pixel electrode 608 are strongly influenced by electric fields from points D, E, F, and the like on the counter electrode 603 closer to the point B. They are also influenced by electric fields including slant components from the points D, E, F, and the like. This may disturb the orientation of the liquid crystal molecules.

As a result of the disturbance of the orientation of the liquid crystal molecules, transmitted light from a backlight incident on the region of the pixel electrode 608 is scattered at points of the periphery of the pixel electrode 608 such as the point B. This reduces the contrast of the liquid crystal display device.

A liquid crystal display device for minimizing the influence of the slant components of the electric field to reduce the display defect is disclosed in Japanese Publication for Opposition No. 2520595. This liquid crystal display device, as the second prior art example, includes a plurality of stripe-shaped counter electrodes in place of the counter electrode described in the first prior art example.

In order to form stripe-shaped counter electrodes, however, a photolithographic step and an etching step are required to pattern the film for the counter electrode. This increases the number of steps, reduces the yield, and thus increases the production cost. Moreover, when the stripe-shaped counter electrodes are formed for a large-size and/or high-precision liquid crystal display device, the interconnection resistance of the counter electrodes increases, reducing the display quality, As the third prior art example, Japanese Laid-Open Publication No. 5-249494 discloses a liquid crystal display device where steps on a substrate surface formed around bus lines are angularly controlled for reducing the generation of reverse tilt domains and thus improving the display quality. Reverse tilt domains are generated due to a failure in the control of the orientation direction of liquid crystal molecules caused by a failure in the alignment processing during the step of forming an alignment film. Alternatively, a liquid crystal display device having superficial concave grooves formed between adjacent pixel electrode portions is disclosed in Japanese Laid-Open Publication No. 7-20497.

However, in the above-described structures of the active matrix substrate, although the generation of the reverse tilt domains is suppressed, the problem of the influence of slant components of the electric field is not solved. As a result, it is not possible to completely inhibit the generation of the reverse tilt domains.

As the fourth prior art example, Japanese Laid-Open Publication No. 6-82795 and No. 8-32820 disclose the following liquid crystal display device. That is, in order to reduce the amount of beads scattered on the surface of the pixel electrode portions to improve the display quality, a potential difference is provided between bus line regions made of metal and the like and the other regions to allow beads to attach only to specific portions.

However, in order to fabricate a liquid crystal display device with the above structure, respective bus lines must be charged. It takes time to position terminals for charging under substantially an equal pressure. Moreover, for a high-precision liquid crystal display device, a uniform charging is difficult, requiring the provision of a specific structure or step for interconnecting. Fabricating such a liquid crystal display device increases the production cost.

In the liquid crystal display devices of the first to fourth prior art examples described above, the components for driving the pixel electrodes, such as the switching elements, the gate bus lines, and the source bus lines, are disposed on the second substrate. In order to electrically isolate functional films (e.g., conductive films and semiconductor films) for these components from one another, the components are arranged with predetermined spaces from one another on the same plane. In the regions corresponding to such spaces, it is not possible to apply a voltage to the liquid crystal layer to control the light blocking and transmission by the liquid crystal layer. The black matrix (BM) layer therefore needs to be disposed on the first substrate to block light from these regions. In such liquid crystal display devices, the source bus lines are arranged in the regions where the BM layer is formed. Since the metal film constituting the source bus lines also serves as a light-blocking layer, only a small portion of the regions covered with the BM layer is substantially blocked from light by only the BM layer made of a photosensitive resin material.

In the liquid crystal display devices of the first to fourth prior art examples, the gate bus lines and the source bus lines are arranged on the same substrate via an insulating film therebetween. This tends to cause a short circuit therebetween, thereby reducing the production yield.

In order to solve the above problem, a structure where the source bus lines are arranged on the first substrate while the switching elements and the gate bus lines are arranged on the second substrate (hereinbelow, such a structure is referred to as a counter source structure) is disclosed in the following literature:

(1) J. F. Clerc et al., "New Electronics Architectures for Liquid Crystal Displays Based on Thin Film Transistors", Japan Display '86

(2) K. Oki et al., "New Active Matrix Full Color Liquid Crystal Display", ITEJ Technical Report, vol. 11, No. 27, pp. 73–78

(3) K. Oki et al., Japanese Laid-Open Publication No. 62-133478, "Active Matrix Display Device".

A liquid crystal display device having the counter source structure will be described with reference to FIG. 10 as the fifth prior art example.

The liquid crystal display device having the counter source structure includes source bus lines 1009 formed on a first substrate, and gate bus lines 1010, reference lines 1021 for applying a reference potential to a liquid crystal layer, pixel electrodes 1008, and switching elements 1011 formed on a second substrate. The first substrate and the second substrate are disposed facing each other with a predetermined gap therebetween. The liquid crystal layer is formed between the substrates. In the liquid crystal display device having the counter source structure, since no crossings between the gate bus lines 1010 and the source bus lines 1009 are formed on the second substrate, a short circuit between a gate bus line and a source bus line is prevented. This increases the yield in the fabrication of the liquid crystal display device. Moreover, since no crossings between the gate bus lines 1010 and the source bus lines 1009 are formed on the second substrate, the gate bus lines and the source bus liens are less affected by capacitance coupling, eliminating a problem of signal delay.

However, the following problem arises when the counter source structure shown in FIG. 10 is applied to a color liquid crystal display device.

For color display, a color filter layer composed of color layers of different colors which selectively transmit light beams having specific wavelengths must be formed on the first substrate. In the case of the counter source structure, the source bus lines are formed on the first substrate on which the color filter layer is formed. This means that no source lines made of a metal film exist at positions on the second substrate corresponding to the BM layer as in the case of the liquid crystal display device shown in FIGS. 6A and 6B. This necessitates the formation of a BM layer made of a photosensitive resin material and the like to block light from the regions other than the colored portions.

When a BM layer is provided, however, steps may be formed on the surface of the counter substrate (first substrate). In such a case, the orientation of liquid crystal molecules in the liquid crystal layer is disturbed in the vicinity of the steps, reducing the display quality. Therefore, in order to maintain good display quality, the control of the thickness of the BM layer is critical.

SUMMARY OF THE INVENTION

The liquid crystal display device of the invention includes a first substrate and a second substrate facing each other with a liquid crystal layer interposed therebetween, the first substrate including: color layers of different colors each having a plurality of colored portions; a transparent conductive film formed to cover the colored portions as a counter electrode; and a black matrix layer made of an insulating material for blocking light from regions other than the colored portions.

In one embodiment of the invention, the insulating material is a resin.

In another embodiment of the invention, the thickness of the black matrix layer is equal to or less than the thickness of the colored portions.

In still another embodiment of the invention, the first substrate includes a first common transfer electrode which is electrically connected to the counter electrode and is formed on at least one of the plurality of colored portions, and the second substrate includes a second common transfer electrode which is electrically connected to the counter electrode of the first substrate.

According to another aspect of the invention, a method for fabricating a liquid crystal display device including a first substrate and a second substrate facing each other with a liquid crystal layer interposed therebetween is provided. The method includes the steps of: a) forming a color filter having a plurality of colored portions of different colors on the first substrate; b) forming a transparent conductive film to cover the colored portions as a counter electrode; and c) forming a black matrix layer for blocking light from regions other than the colored portions by forming a black resin film on the transparent conductive film and removing portions of the black resin film located above the colored portions.

In one embodiment of the invention, the method further includes the step of scattering dielectric beads on the black matrix layer by charging the transparent conductive film with a positive or negative potential and supplying particles of the dielectrode beads charged with a potential of the same polarity as the potential at the transparent conductive film on the first substrate.

In another embodiment of the invention, the first substrate includes a first common transfer electrode which is electrically connected to the counter electrode, the second substrate includes a second common transfer electrode which is electrically connected to the counter electrode of the first substrate, and the method further includes the step of forming at least one of the plurality of colored portions on the first common transfer electrode.

Alternatively, the liquid crystal display device of this invention includes a first substrate and a second substrate facing each other with a liquid crystal layer interposed therebetween, wherein the second substrate includes: a plurality of pixel electrodes arranged in a matrix; a plurality of gate bus lines arranged in parallel with one another along near the pixel electrodes; switching elements for selectively driving the pixel electrodes; and reference lines arranged in parallel with the gate bus lines for applying a reference potential to the switching elements, wherein the first substrate includes: a color filter layer having colored portions of a plurality of colors arranged to correspond to pixel regions; and a plurality of source bus lines formed on the color filter layer to cross the gate bus lines, and wherein a black matrix layer made of a photosensitive resin material is formed to partly overlap the source bus lines and fill gaps between the colored portions, and a thickness of the black matrix layer overlapping the source bus lines is equal to or less than a thickness of the color filter layer.

In one embodiment of the invention, the thickness of the black matrix layer overlapping the source bus lines is 400 nm or more.

In another embodiment of the invention, peripheries of the colored portions are tapered, and the black matrix layer partly overlaps the tapered peripheries.

In still another embodiment of the invention, a thickness of overlap portions of the black matrix layer and the tapered peripheries of the colored portions is equal to or less than a thickness of centers of the colored portions.

Alternatively, the method for fabricating a liquid crystal display device is provided. The liquid crystal display device includes a first substrate and a second substrate facing each other with a liquid crystal layer interposed therebetween, wherein the second substrate includes: a plurality of pixel electrodes arranged in a matrix; a plurality of gate bus lines arranged in parallel with one another along near the pixel electrodes; switching elements for selectively driving the pixel electrodes; and reference lines arranged in parallel with the gate bus lines for applying a reference potential to the switching elements, wherein the first substrate includes: a color filter layer having colored portions of a plurality of colors arranged to correspond to pixel regions; and a plurality of source bus lines formed on the color filter layer to cross the gate bus lines, and wherein a black matrix layer made of a photosensitive resin material is formed to partly overlap the source bus lines and fill gaps between the colored portions, and a thickness of the black matrix layer overlapping the source bus lines is equal to or less than a thickness of the color filter layer. The method includes the steps of: forming the color filter layer having colored portions of a plurality of colors on the first substrate; forming the source bus lines made of a transparent conductive film on the color filter layer; and providing a black matrix material of a photosensitive resin on the first substrate and patterning the black matrix material by exposing a back surface of the first substrate to light with a predetermined light exposure to form the black matrix layer having a thickness equal to or less than a thickness of the color filter layer and equal to or more than 400 nm.

According to the liquid crystal display device of the present invention, the transparent conductive film is formed on the color filter layer composed of the colored portions without forming a smoothing film and the like therebetween. Accordingly, the electrode formed of the transparent conductive film has concave portions in the gaps between the colored portions corresponding to the pixel electrodes. If protrusions are formed between the colored portions, areas around such protrusions will become difficult to be rubbed desirably in a subsequent rubbing step. According to the liquid crystal display device of the present invention, such protrusions from the substrate surface are reduced at the final stage, and thus, an alignment film can be appropriately formed in the pixel portions.

Since the concave portions are originated from the surface structure of the underlying colored portions, no special concave formation step using an additional material is required. This reduces the production cost. Moreover since the black matrix layer made of a resin material (the resin BM layer) is formed filling these concave portions, the capacitance between a source bus line and the counter electrode includes a coupling capacitance via the resin BM layer as well as the liquid crystal layer. As a result, the conventional signal delay due to a capacitance at the periphery of a pixel can be suppressed. Furthermore, the slant components of the electric field from the counter electrode toward the periphery of the pixel electrode reduces, and the generation of the reverse tilt domain is suppressed. This further improves the display quality of the liquid crystal display device.

The counter electrode is continuously formed over substantially the entire top surface of the first substrate, and the insulating black matrix layer is sporadically formed thereon. Accordingly, a voltage can be easily applied to the counter electrode without damaging the counter electrode. This makes it possible to easily establish a potential difference on the surface of the first substrate, between the portions located above the colored portions and the other portions (on the BM layer). As a result, charged microparticles can be selectively placed on the BM layers.

Protrusions from the surface of the counter substrate can be reduced by forming the BM layer having a thickness equal to or less than the thickness of the color filter layer. The height of such protrusions is preferably about 500 nm, more preferably about 400 nm or less. This contributes to eliminating generation of the reverse tilt domain.

During the formation of the color filter layer, at least one colored portion is extended to a position corresponding to the second common transfer electrode formed on the second substrate. This allows for a good electrical connection (common transfer) between the first and second substrates. At this time, if a plurality of color filter layers of different colors are stacked in the common transfer portion, the cell thickness (the thickness of the liquid crystal layer) reduces in the common transfer portion. As a result, the amount of carbon paste required for the connection between the substrates reduces and the reliability against a short circuit improves.

According to the method for fabricating a liquid crystal display device of the present invention, the transparent conductive film is formed on the colored portions without forming a smoothing film and the like therebetween. Accordingly, the electrode formed of the transparent conductive film has concave portions in the gaps between the colored portions corresponding to the pixel electrodes. If portions are formed between the colored portions, areas around such protrusions will become difficult to be rubbed desirably in a subsequent rubbing step. According to the method of the present invention for forming a liquid crystal display device, protrusions from the substrate surface to be rubbed are reduced at the final stage, and thus, an alignment film can be appropriately formed in the pixel portions.

Since the concave portions originate from the surface structure of the underlying colored portions, special step and/or material are not required for forming the concave portions. This reduces the production cost.

Moreover, according to the method of the present invention, the resin BM layer is formed filling these concave portions. Accordingly, the method according to the present invention can fabricate a liquid crystal display device where the capacitance between a source bus line and the counter electrode includes a coupling capacitance via the resin BM layer as well as the liquid crystal layer. As a result, the conventional signal delay via a capacitance at the periphery of a pixel can be suppressed. Furthermore, according to the method of the present invention, the slant components of the electric field from the counter electrode toward the periphery of the pixel electrode reduces, and the generation of the reverse tilt domain is suppressed. Accordingly, a liquid crystal display device with improved display quality can be fabricated.

According to the method of the present invention, on the transparent conductive film of the first substrate charged with a positive or negative potential, particles of dielectric beads charged with a potential of the same polarity as the potential at the transparent conductive film are supplied. Such dielectric beads mostly attach to the BM layer. Accordingly, selective supply of the dielectric beads only on the BM layer is easily realized. Thus, a high-quality liquid crystal display device which can minimize scattering of transmitted light in the liquid crystal layer for each pixel electrode can be fabricated.

According to the method of the present invention, during the formation of the colored portions, at least one colored portion is extended to a position corresponding to the second common transfer electrode formed on the second substrate. Thus, according to the method of the present invention, a liquid crystal display device where a good electrical connection (common transfer) is secured between the first and second substrates can be fabricated without increasing the number of steps. In the formation of the common transfer portion, if a plurality of color layers with different colors are stacked in the common transfer portion, the cell thickness (the thickness of the liquid crystal layer) reduces in this portion. As a result, the amount of carbon paste required for the connection between the substrates reduces and the reliability against a short circuit improves.

Alternatively, the liquid crystal display device of the present invention includes the first substrate of the counter source structure and the second substrate facing each other with the liquid crystal layer therebetween. The first substrate of the counter source structure includes the color filter layer, the source bus lines, and the BM layer. The second substrate includes the pixel electrodes, the gate bus lines, the switching elements, and the reference lines. The counter source structure serves to prevent an occurrence of a defect due to a short circuit between a gate bus line and a source bus line from occurring. In the counter source structure, since no crossings between the gate bus lines and the source bus lines are formed on the same substrate, the gate bus lines and the source bus lines are less affected by capacitance coupling, eliminating a problem of signal delay.

The BM layer formed between the colored portions serves, not only to flatten the surface of the color filter substrate (first substrate) filling the concave portions between the colored portions, but also to prevent an occurrence of light leakage at regions which do no contribute to display. Since the thickness of the portions of the BM layer which overlap the source bus lines is set to be equal to or less than the thickness of the color filter layer, no steps are formed on the surface of the substrate due to protruding pattern edges of the BM layer. This prevents the orientation of liquid crystal molecules in the liquid crystal layer from being disturbed.

By setting the thickness of the BM layer at 400 nm or more, the transmittance of the BM layer made of a photosensitive resin can be reduced to 0.5% or less (see Table 2 to be presented in Example 2). Thus, an excellent contrast ratio for a liquid crystal display device can be obtained.

The BM layer may overlap the peripheries of the colored portions. In this case, if the thickness of each overlap region (the sum of the thickness of the BM layer and the thickness of the colored portion in the overlap region) is equal to or less than the thickness of the center of the colored portion, no step will be formed on the surface of the substrate due to a pattern edge of the BM layer in the overlap region, preventing the orientation of liquid crystal molecules in the liquid crystal layer from being disturbed.

For example, if the periphery of each colored portion is tapered and the BM layer overlaps the tapered periphery, no pattern edge of the BM layer will protrude from the surface of the substrate as long as the thickness of the overlap region of the BM layer and the colored portion does not exceed the thickness of the center of the colored portion.

The method for fabricating a liquid crystal display device according to the present invention includes, after the steps of forming the color filter layer having colored portions of a plurality of colors and the source bus lines made of a transparent conductive film, the steps of applying or laminating a black matrix material of a photosensitive resin to the substrate and exposing the back surface of the resultant substrate to light. During the exposure step, only portions of the BM material are exposed to light by using the color filter layer as a mask, so that the BM layer remains in the gaps between the colored portions. At this step, by adjusting the thickness of the BM material and the light exposure, the thickness of the portions of the BM layer which overlap the source bus lines can be controlled to be equal to or less than the thickness of the colored portions and equal to or more than 400 nm.

Thus, the invention described herein makes possible the advantages of (1) providing a liquid crystal display device capable of improving the display quality and reducing the production cost, and a method for fabricating such a liquid crystal display device, and (2) providing a liquid crystal display device having a counter source structure where a black matrix layer has a sufficient light blocking property, the orientation of liquid crystal molecules is not disturbed and thus providing good display quality, and the production yield is improved; and a method for fabricating such a liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 5A is a plan view illustrating an alternative common transfer portion of the counter substrate of the liquid crystal display device of Example 1 according to the present invention.

FIG. 5B is a sectional view taken along line 5B—5B of FIG. 5A.

FIG. 9A is a plan view, together with a corresponding sectional views, of a conventional liquid crystal display device.

FIG. 9B is a plan view, together with a corresponding sectional views, illustrating a common transfer portion of an active matrix substrate of the conventional liquid crystal display device.

FIG. 9C is a plan view, together with a corresponding sectional view, illustrating a common transfer portion of a counter substrate of the conventional liquid crystal display device.

DESCRIPTION OF THE PREFERRED EMBODIMENTS

Hereinbelow, the present invention will be described by way of example with reference to the accompanying drawings.

(EXAMPLE 1)

Figure 1A:
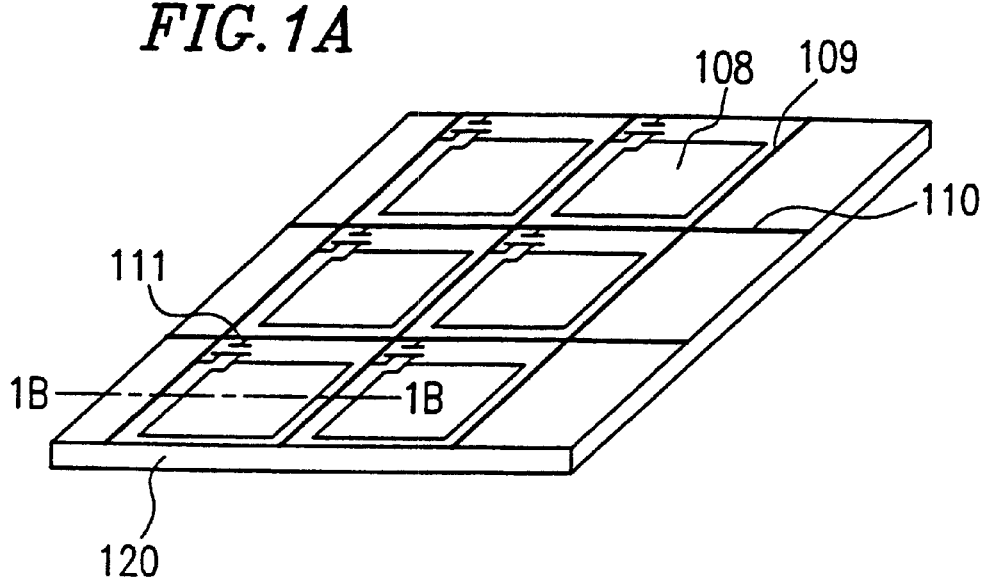
FIG. 1A is a perspective view of a liquid crystal display device of Example 1 according to the present invention.
Figure 1B:
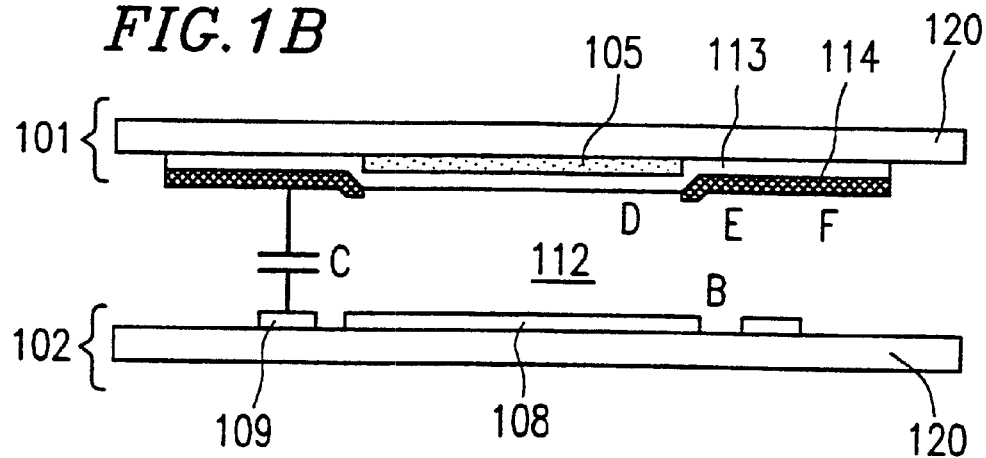
FIG. 1B is a sectional view taken along line 1B—1B of FIG. 1A.

FIG. 1A is a perspective view of a liquid crystal display device of Example 1 according to the present invention. FIG. 1B is a sectional view taken along line 1B—1B of FIG. 1A.

Referring to FIG. 1B, the liquid crystal display device according to the present invention includes a first substrate 101 (hereinbelow, referred to as a counter substrate) and a second substrate 102 (hereinbelow, referred to as an active matrix substrate) disposed to face each other with a predetermined gap therebetween. A liquid crystal layer 112 is provided between the substrates 101 and 102. Referring to FIG. 1A, the active matrix substrate 102 includes: a plurality of parallel source bus lines 109 and a plurality of parallel gate bus lines 110 which are formed on the surface of a glass substrate 120 facing the liquid crystal layer 112; and thin film transistors (TFTs) 111 disposed at the respective crossings of the source bus lines 109 and the gate bus lines 110. Pixel electrodes 108 are formed on the surface of the glass substrate 120 facing the liquid crystal layer 112 and connected to drain electrodes of the corresponding TFTs 111. A voltage is applied to each of the pixel electrodes 108 for controlling the orientation direction of liquid crystal molecules in the liquid crystal layer 112.

Referring to FIG. 1B, the counter substrate 101 includes: a plurality of colored portions 105 having a thickness of about 1.4 to 1.5 $\mu$m formed at positions corresponding to the pixel electrodes 108 of the active matrix substrate 102; and a counter electrode 113. A black matrix (BM) layer 114 made of a light-blocking black resin having a thickness of about 1.2 to 1.4 $\mu$m is formed on the counter electrode 113 at portions corresponding to the gaps between the adjacent colored portions 105.

In the liquid crystal display device with the above configuration according to the present invention, a scanning signal voltage is sequentially applied to the gate bus lines 110 so as to switch on the TFTs 111 connected to the respective gate bus lines 110, thereby allowing a specific display signal voltage to be written in each of the pixel electrodes 108 and held for a certain time period. The liquid crystal layer 112 interposed between the substrates 101 and 102 is driven with the potential difference between the voltage at each of the pixel electrodes 108 and a counter voltage applied to the counter electrode 113.

According to the present invention, in the counter substrate 101, the portions of the counter electrode 113 corresponding to the gaps between the adjacent pixel electrodes 108 of the active matrix substrate 102 are recessed forming concave portions, and such concave portions are filled with the BM resin layer 114 as shown in FIG. 1B. Accordingly, when the liquid crystal layer 112 interposed between the substrates 101 and 102 is driven with the potential difference between each of the pixel electrodes 108 and the counter electrode 113, the capacitance between the counter electrode 113 and each of the source bus lines 109 relatively reduces, and also the slant components of the electric field between the counter electrode 113 and the periphery of the pixel electrode 108 reduces. As a result, a high-contrast and high-quality display can be realized.

The BM resin layer 114 can be provided with a good light-blocking property if it is formed so as to completely fill the concave portions of the counter electrode 113 and have a flat surface having no protrusions from the surface of the counter substrate 101. This also allows for a uniform alignment processing. As a result, the display quality of the resultant liquid crystal display device can be further improved.

In this example, the active matrix liquid crystal display device where the gate bus lines and the source bus lines are formed on the same substrate is described. It should be understood that the method of the present invention is also applicable to other types of liquid crystal display devices, such as a liquid crystal display device where stripe-shaped source bus lines are formed on a counter substrate which is different from a substrate including gate bus lines and a single matrix type liquid crystal display device.

Figure 2A:
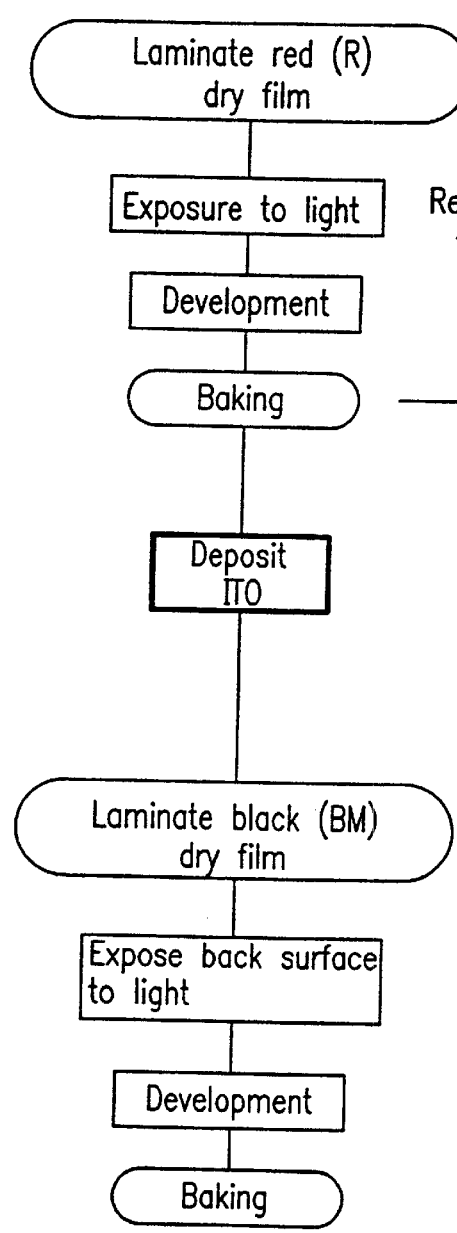
FIG. 2A is a flowchart showing fabrication steps for a counter substrate having colored portions of the liquid crystal display device of Example 1 according to the present invention.
Figure 2B:
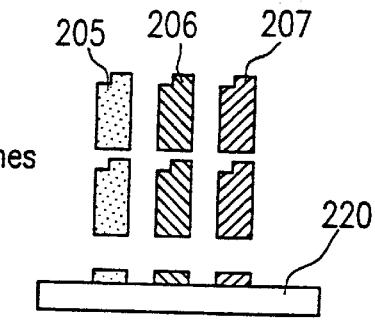
FIGS. 2B, 2C, and 2D are plan views, together with corresponding sectional views, at the respective fabrication steps shown in FIG. 2A.
Figure 2C:
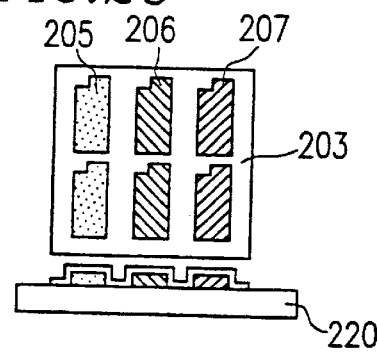
Figure 2D:
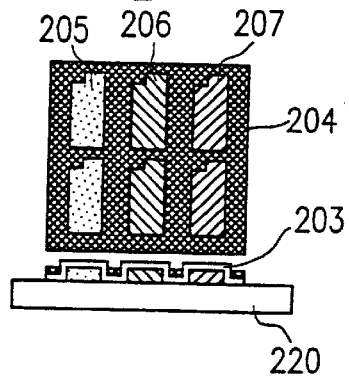
Figure 2E:
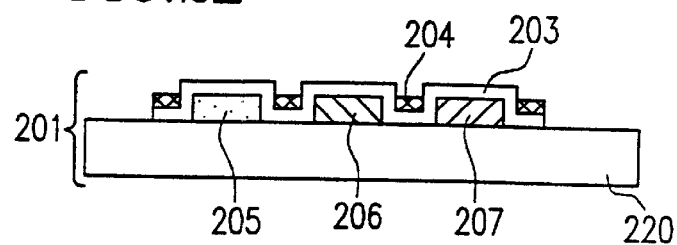
FIG. 2E is a sectional view of the counter substrate fabricated by the fabrication steps shown in FIG. 2A.

FIG. 2A is a flowchart showing fabrication steps for the counter substrate having a color filter layer composed of R, G, and B color layers. FIGS. 2B to 2D are plan views, together with corresponding sectional views, at the respective fabrication steps. FIG. 2E is a sectional view of the complete counter substrate.

First, referring to FIG. 2B, a dry film having red (R) pigments dispersed therein is laminated to a glass substrate 220, followed by steps such as exposure to light, development, and baking, to form a R color layer composed of a plurality of stripe-shaped R colored portions 205.

A dry film having green (G) pigments dispersed therein is then laminated over substantially the entire top surface of the resultant substrate covering the R colored portions 205. This is followed by steps such as exposure to light, development, and baking, to form a G color layer composed of a plurality of stripe-shaped G colored portions 206.

A B color layer composed of a plurality of stripe-shaped B colored portions 207 is then formed by repeating the process for the G color layer described above. Thus, the color filter layer composed of the R, G, and B three-color layer is formed. The colored portions are formed so as to correspond to respective rows of pixel electrodes.

Referring to FIG. 2C, ITO is deposited on the resultant substrate to form a counter electrode 203. Referring to FIG. 2D, a black dry film is laminated to the resultant substrate. In this state, using the R, G, and B colored portions 205, 206, and 207 as a mask, the back surface of the substrate is exposed to light, to form a BM resin layer 204 in a predetermined shape.

As described above, by combining the dry film method and the light exposure to the back surface of the substrate, the BM resin layer 204 having a predetermined thickness and area can be formed easily with high precision without the necessity of forming an additional mask. Moreover, as shown in FIG. 2E, since protrusions of the BM resin layer 204 are reduced, the surface of the resultant counter substrate 201 can be made flat.

Figure 3:
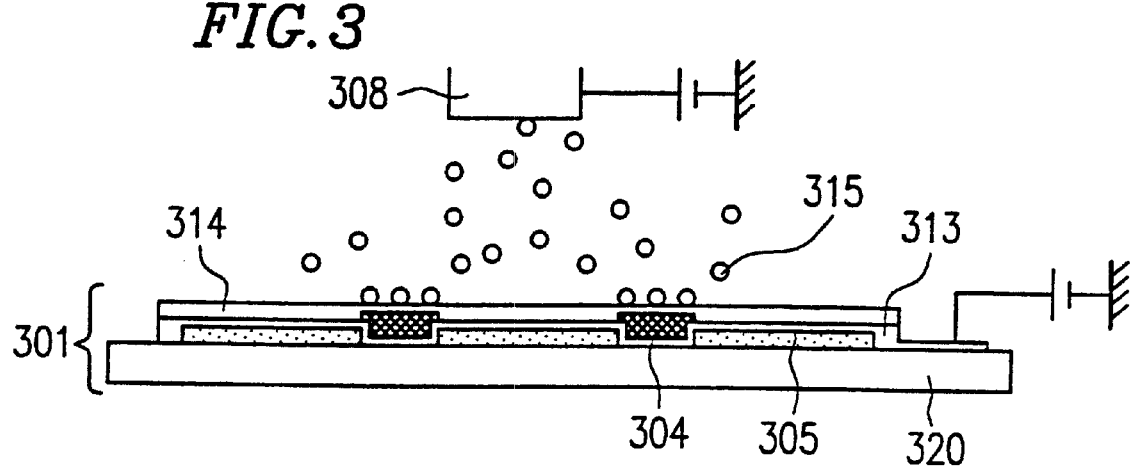
FIG. 3 is a sectional view of the counter substrate, illustrating the step of dispersing dielectric beads for holding the thickness of a liquid crystal cell of the liquid crystal display device of Example 1 according to the present invention.

FIG. 3 is a sectional view of the counter substrate, illustrating the step of dispersing dielectric beads for holding the thickness of the liquid crystal cell of the liquid crystal display device according to the present invention.

Referring to FIG. 3, polyimide is printed on a fabricated counter substrate 301 and rubbed to form an alignment film 314. Thereafter, while a counter electrode 313 (made of ITO as described above) is being positively charged by applying a positive voltage to the counter electrode 313, dielectric beads 315 for holding the cell thickness, which are also positively charged, are dispersed over the counter substrate 301. The dielectric beads 315 are repulsive by and away from the portions of the counter electrode 313 located on the colored portions 305 facing pixel electrodes 308 due to electrostatic force, resulting in their selectively gathering on the portions where the BM resin layer 304 is formed.

Hereinbelow, the formation of a common transfer portion according to the present invention will be described. In the liquid crystal display device fabricated by the method according to the present invention, the electrical connection between the counter substrate and the active matrix substrate will not be secured if the common transfer portion is formed in the conventional manner to provide a layered structure of the glass substrate/ITO/BM/carbon paste. If an additional processing is performed for solving this problem, the problem of an increased number of steps arises. Accordingly, the manufacture of a liquid crystal display device which provides a good electrical connection between the counter substrate and the active matrix substrate is required without increasing the number of steps.

Figure 4A:
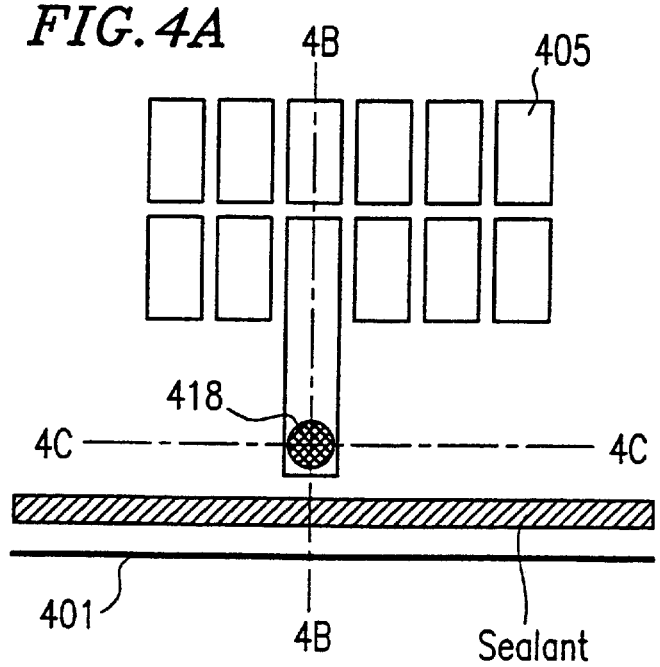
FIG. 4A is a plan view illustrating a common transfer portion of the counter substrate of the liquid crystal display device of Example 1 according to the present invention.
Figure 4B:
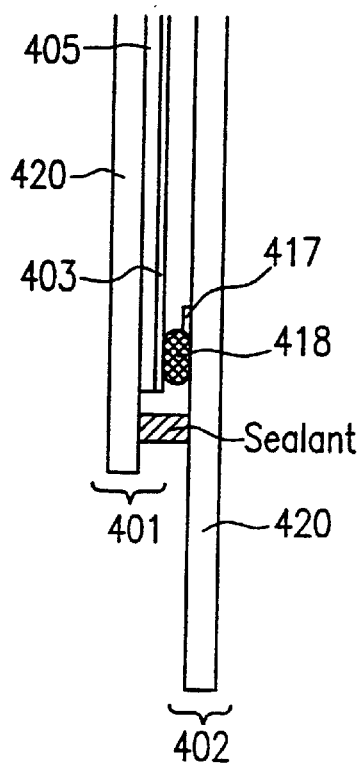
FIG. 4B is a sectional view taken along line 4B—4B of FIG. 4A.
Figure 4C:
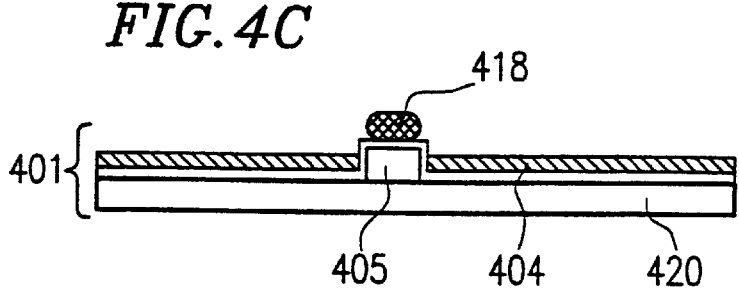
FIG. 4C is a sectional view taken along line 4C—4C of FIG. 4A.

FIG. 4A is a plan view illustrating a common transfer portion of the counter substrate of the liquid crystal display device according to the present invention. FIG. 4B is a sectional view taken along line 4B—4B of FIG. 4A. FIG. 4C is a sectional view taken along line 4C—4C of FIG. 4A.

A dry film having red (R) pigments dispersed therein is laminated to a glass substrate 420, followed by exposure to light, development, and baking, to form R colored portions having a predetermined shape. Subsequently, G colored portions and B colored portions are formed in the same manner as that for the R colored portions. As shown in FIGS. 4A and 4B, during the step of forming the colored portions, at least one colored portion 405 of a single color is extended to a position corresponding to a common transfer electrode 417 formed on an active matrix substrate 402.

Thereafter, ITO is deposited to the resultant substrate to form a counter electrode 403. A black dry film is then laminated to the resultant substrate. In this state, using the R, G and B colored portions as a mask, the back surface of the substrate is exposed to light, to form a BM resin layer 404 in the regions where the colored portions are not formed. At this time, it should be noted that the BM resin layer 404 is not formed in the common transfer portion since the extension of the colored portion 405 is formed in the common transfer portion. In other words, in the liquid crystal panel of the present invention, the common transfer portion of the counter substrate has a layered structure of the glass substrate 420/the colored portion 405/the counter electrode (ITO) 403/carbon paste 418 formed in this order as shown in FIG. 4C, while the other portion of the periphery of the counter substrate has a structure of the glass substrate 420/the counter electrode (ITO) 403/the BM resin layer 404 formed in this order. As a result, a good electrical connection between the counter substrate 401 and the active matrix substrate 402 is secured in the liquid crystal display device of the present invention.

Alternatively, the common transfer portion may be configured as shown in FIGS. 5A and 5B, for example. That is, the common transfer portion of a counter substrate 501 may include an additional colored portion 506 of a color different from the color of a colored portion 505 which has been extended to a position corresponding to a common transfer electrode formed on an active matrix substrate, during the step of forming the color filter layer. In this case, the common transfer portion of the counter substrate 501 has a structure of a glass substrate 520/the colored portion 505/the colored portion 506/a counter electrode (ITO) 503/carbon paste 518 formed in this order. This makes it possible to markedly reduce the transmittance of the common transfer portion, compared with the case where a colored portion of a single color is used.

The common transfer portion is normally blocked from light by the second common transfer electrode formed on the active matrix substrate and the like. However, light may leak due to inferior panel bonding and the like. It is therefore desirable to form a plurality of colored portions of different colors for the common transfer portion of the counter substrate to reduce the transmittance thereof. The maximum transmittance can be further reduced by a combination of R, G, and B three colored portions as shown in Table 1 below.

TABLE 1

Transmittance in combination of colors

| Color combination | Max. transmittance | Wavelength |
|---|---|---|
| R/G | 16.0% | 596 nm |
| R/B | 6.8% | 700 nm |
| G/B | 28.2% | 518 nm |
| R/G/B | 1.5% | 517 nm |

In a normal TN liquid crystal mode and the like, the cell thickness (the thickness of the liquid crystal layer) is normally about 4.5 μm. According to the present invention, by forming two or three color layers in the common transfer portion, the cell thickness in the common transfer portion is reduced. This reduces the amount of the carbon paste required for connecting the two substrates and also increases the reliability against a short circuit.

(EXAMPLE 2)

Figure 1C:
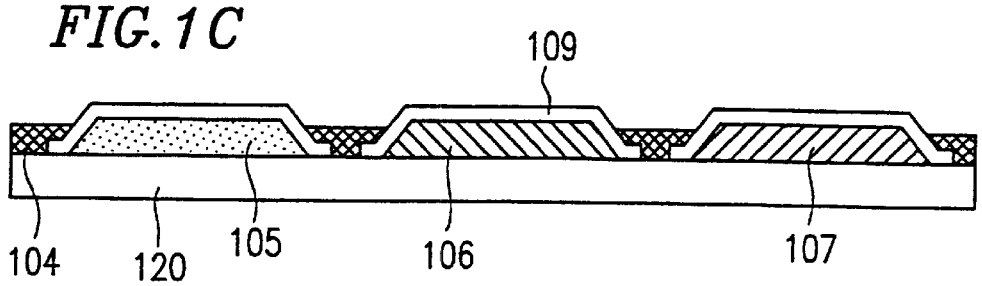
FIG. 1C is a sectional view schematically illustrating a color filter substrate of a liquid crystal display device of Example 2 according to the present invention.

FIG. 1C is a sectional view schematically illustrating a first substrate (hereinbelow, referred to as a color filter substrate) of the liquid crystal display device of Example 2 according to the present invention.

The color filter substrate includes red (R) colored portions 105, green (G) colored portions 106, and blue (B) colored portions 107 formed on a glass substrate 120 at positions corresponding to pixel regions. Source bus lines 109 made of a transparent conductive film are formed over the respective colored portions. A black matrix (BM) layer 104 fills gaps between the colored portions overlapping peripheries of the colored portions.

Figure 10:
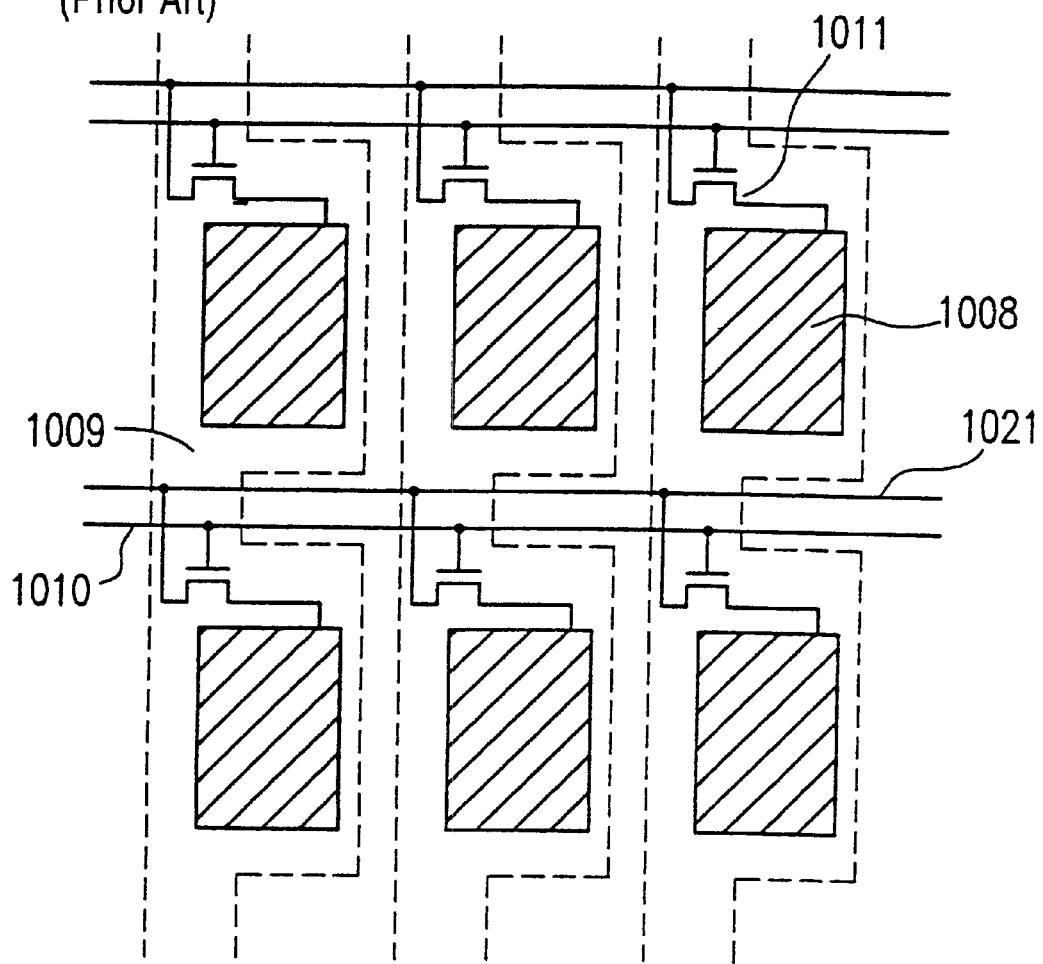
FIG. 10 is a plan view of a conventional liquid crystal display device having a counter source structure.

The color filter substrate having the above structure is bonded with a second substrate including components as shown in FIG. 10, such as the pixel electrodes 1008 arranged in a matrix, the gate bus lines 1010 arranged in a direction crossing the source bus lines 109, the switching elements 1011, e.g., thin film transistors (TFTs), for selectively driving the pixel electrodes 1008, and the reference lines 1021 for applying a reference potential to the switching elements. A liquid crystal layer is formed between these substrates, thus to complete the liquid crystal display device.

The liquid crystal display device of this example can be fabricated in the following manner, for example.

First, a resin film (dry film) with red (R) pigments dispersed therein is laminated to the glass substrate 120, followed by exposure to light, development, and baking, to form the R colored portions 105 by patterning at positions corresponding to R pixel regions.

A dry film having green (G) pigments dispersed therein is then laminated to the resultant substrate covering the R colored portions 105. This is followed by steps of exposure to light, development, and baking, to form the G colored portions 106 by patterning at positions corresponding to G pixel regions.

The blue (B) colored portions 107 are then formed by patterning in the manner employed for the R colored portions 105 and the G colored portions 106. Thus, a color filter layer composed of the R, G, and B colored portions is completed. In the above process, as well as a process of forming the BM layer described hereinbelow, a photosensitive resin material having pigments dispersed therein may be applied to the entire surface of the resultant substrate by spin coating, instead of the lamination of a dry film. The order of the colors for the formation of the colored portions may be different from that described above.

In this example, the color filter layer was formed using Transfer Film manufactured by Fuji Photo Film Co., Ltd. as the dry film for each color. The thickness of the dry film was originally 2 μm, and reduced to 1.7 μm to 1.8 μm after baking and curing.

ITO is then deposited by sputtering, patterned by photolithography using a resist, and etched using iron (II) chloride, to form the source bus lines 109.

Thereafter, a dry film having carbon particles dispersed therein is laminated to the resultant substrate. In this state, using the colored portions of the color filter layer as a mask, the back surface of the substrate is exposed to light, followed by development and baking, to form a BM layer 104 made of a photosensitive resin material. At this time, the portions of the photosensitive resin material located on tapered peripheries of the colored portions also receive light to be cured and left behind, so that the gaps between the pattern of the colored portions and the pattern of the BM layer can be filled. Thus, the surface of the resultant substrate can be flattened.

In this example, Transer Film manufactured by Fuji Photo Film Co., Ltd. was used as the dry film, and the original thickness of the film, 1.5 μm, was reduced to a desired thickness by adjusting the light exposure.

Figure 6A:
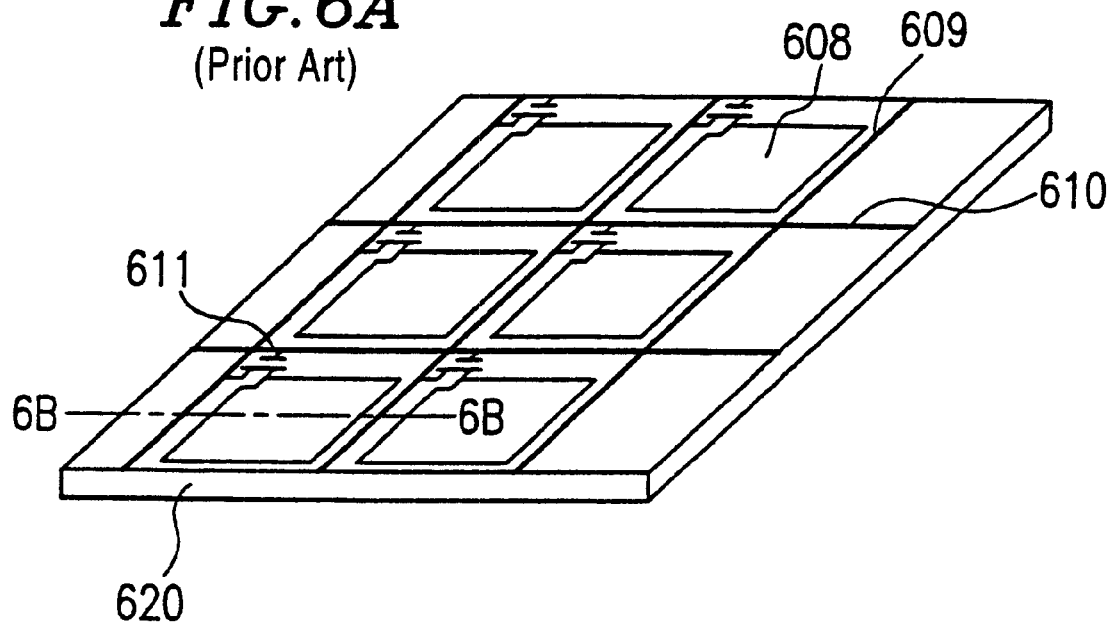
FIG. 6A is a perspective view of a conventional liquid crystal display device.
Figure 6B:
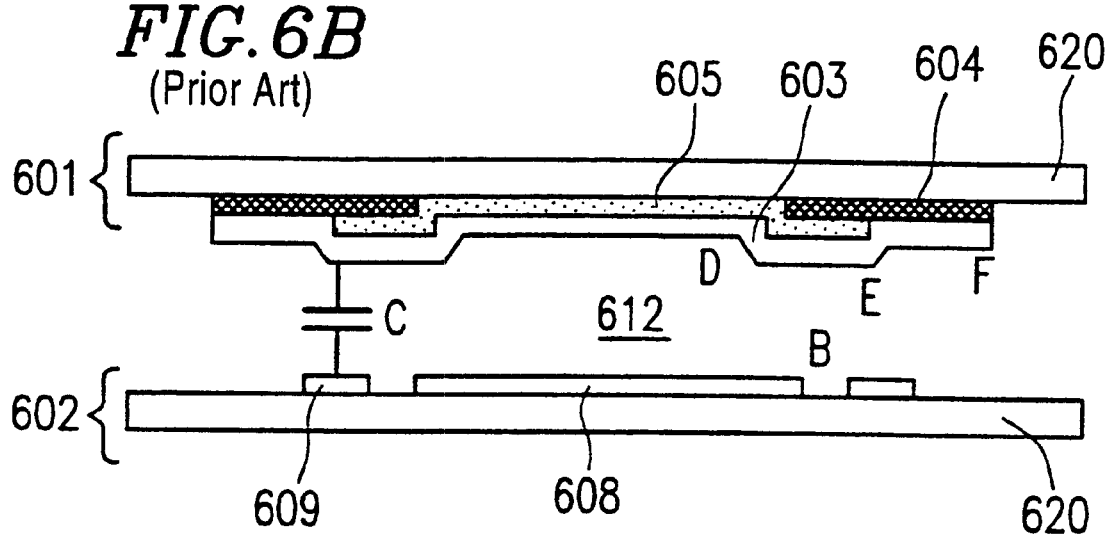
FIG. 6B is a sectional view taken along line 6B—6B of FIG. 6A.
Figure 7A:
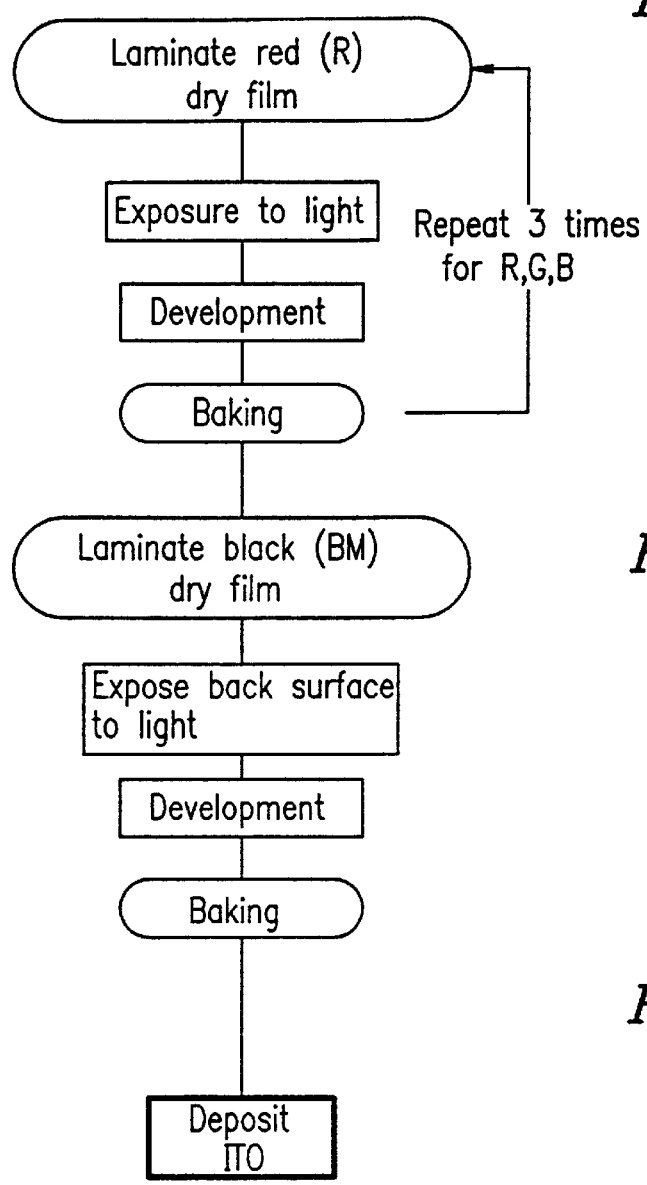
FIG. 7A is a flowchart showing normal fabrication steps by the dry film method for a counter substrate having colored portions of a conventional liquid crystal display device.
Figure 7B:
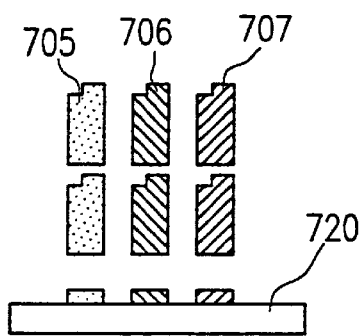
FIGS. 7B, 7C, and 7D are plan views, together with corresponding sectional views, at the respective fabrication steps shown in FIG. 7A.
Figure 7C:
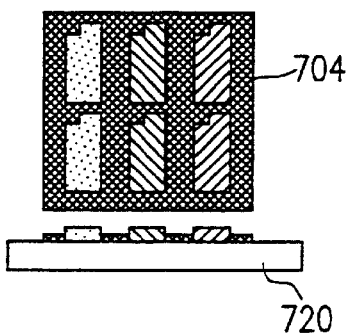
Figure 7D:
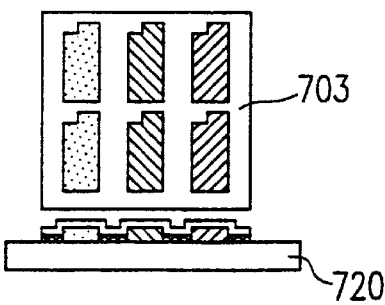
Figure 7E:
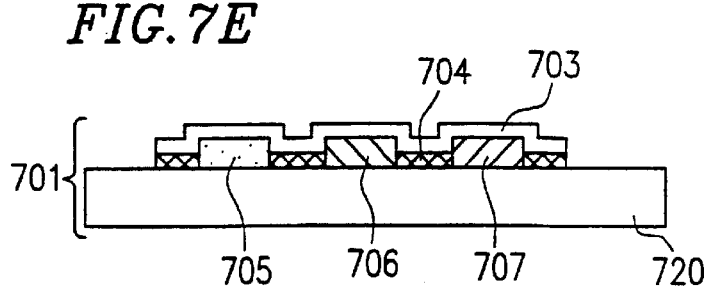
FIG. 7E is a sectional view of the counter substrate fabricated by the fabrication steps shown in FIG. 7A.
Figure 8A:
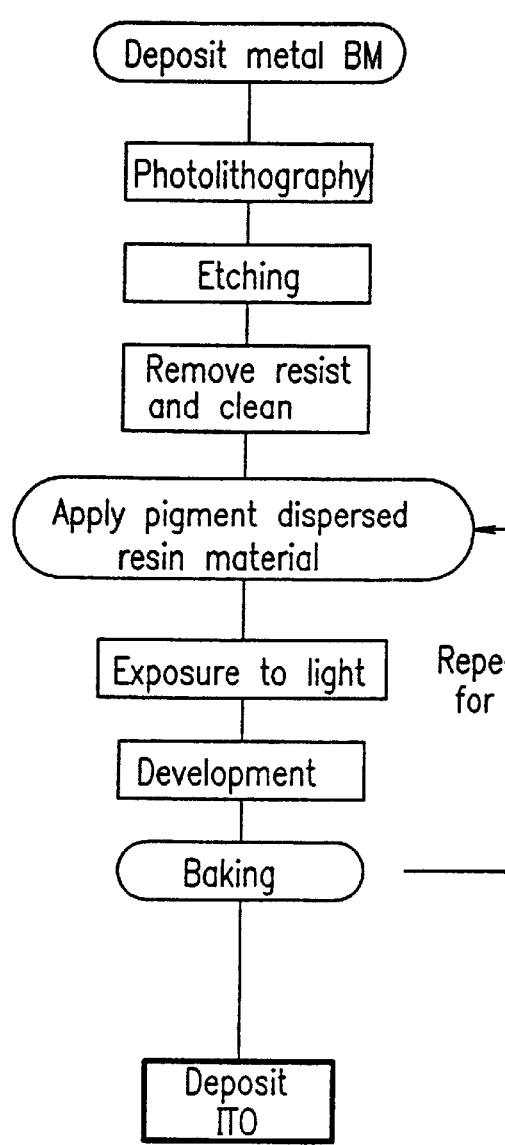
FIG. 8A is a flowchart showing normal fabrication steps by the spin coating method for a counter substrate having colored portions of a conventional liquid crystal display device.
Figure 8B:
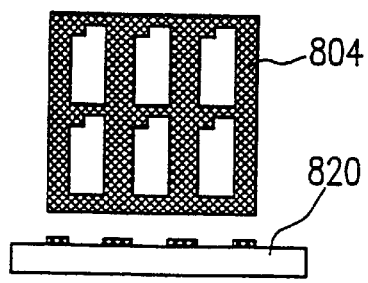
FIGS. 8B, 8C and 8D are plan views, together with corresponding sectional views, at the respective fabrication steps shown in FIG. 8A.
Figure 8C:
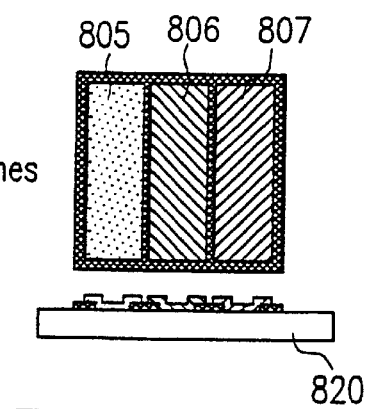
Figure 8D:
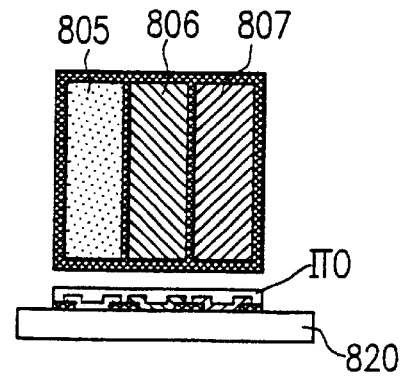
Figure 8E:
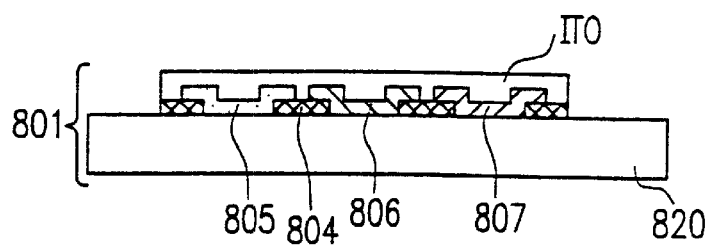
FIG. 8E is a sectional view of the counter substrate fabricated by the fabrication steps shown in FIG. 8A.

Since the BM layer 104 and the source bus lines 109 made of ITO are formed on the same substrate in this example, no source bus lines made of a metal film exist at positions corresponding to the BM layer as in the case of the liquid display device shown in FIGS. 6A and 6B. The BM layer 104 therefore must have a sufficient light-blocking property.

Table 2 below shows the relationship among the back surface light exposure, the remaining film thickness, and the transmittance for the BM layer.

TABLE 2

Change of transmittance with light exposure

| Case | Back surface light exposure | Remaining film thickness | Transmittance |
|---|---|---|---|
| 1 | 5 mJ/cm² | 120 nm | 3.90% |
| 2 | 10 mJ/cm² | 310 nm | 1.11% |
| 3 | 13 mJ/cm² | 350 nm | 0.90% |
| 4 | 17 mJ/cm² | 370 nm | 0.75% |
| 5 | 20 mJ/cm² | 400 nm | 0.50% |
| 6 | 50 mJ/cm² | 920 nm | 0.02% |
| 7 | 130 mJ/cm² | 1520 nm | below 0.01% (below measure limit) |

The light exposure was measured using an integrating actinometer, and the transmittance was measured using a spectrophotometer manufactured by Olympus Optical Co., Ltd. As the remaining film thickness, the portion of the BM layer overlapping the source bus line was measured.

From Table 2 above, it is observed that as the back surface light exposure increases the remaining film thickness increases while the transmittance decreases.

In order to obtain a good contrast ratio for a liquid crystal display device, the transmittance of the BM layer is preferably about 1% or less. The BM material used in this example exhibited a transmittance of about 1% when the thickness thereof was 350 nm to 370 nm. It is therefore desirable to set the back surface light exposure at 15 mJ/cm² or more to obtain the thickness of the BM layer of 370 nm or more.

In order to ensure to block leakage light to further increase the contrast ratio, the transmittance of the BM layer should preferably be about 0.5% or less. Therefore, for the BM material used in this example, it is desirable to set the back surface light exposure at 20 mJ/cm² or more to obtain the thickness of the BM layer of 400 nm or more.

Figure 1D:
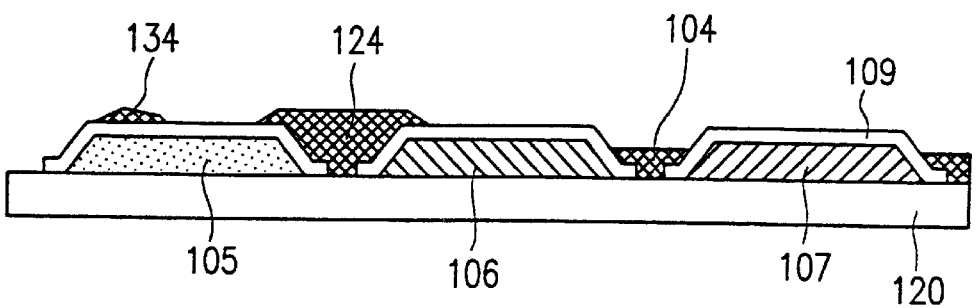
FIG. 1D is a sectional view for describing the thickness of a BM layer.

When the back surface light exposure is increased, the remaining film thickness increases. However, if light is excessively exposed, the BM layer may be left behind on the colored portions of the pixel regions like a BM portion 134 shown in FIG. 1D, or a BM portion having a thickness exceeding the thickness of the colored portions may be formed at the overlap regions of the BM layer and the colored portions like a BM portion 124 shown in FIG. 1D. If the BM portion 134 is left behind on the color filter layer and/or the BM portion 124 protrudes from the color filter layer, the orientation of liquid crystal molecules in the liquid crystal layer is disturbed due to the pattern edges of these BM portions, causing reduction in display quality.

In order to solve the above problem, the light exposure should preferably be adjusted to keep the thickness of the BM layer from exceeding the thickness of the colored portions and keep the thickness of the overlap regions of the BM layer and the colored portions, if overlapping, from exceeding the thickness of the centers of the colored portions. From the measurement results shown in Table 2 above, for the BM material used in this example, the back surface light exposure should preferably be 130 mJ/cm² or less to ensure the remaining film thickness to be equal to or less than the thickness of the color filter layer.

In this example, the back surface light exposure of 20 mJ/cm² was used as an optimal amount to form the BM layer 104 having a thickness of 406 nm.

The color filter substrate obtained in the manner described above is bonded with the second substrate including the pixel electrodes, the gate bus lines, the switching elements, and the reference lines by a known technique so that the gate bus lines and the source bus lines cross each other (at right angles in this case). A liquid crystal material is injected in the gap between these substrates, to complete the liquid crystal display device.

Thus, according to the liquid crystal display device of this example, light leakage is prevented, providing a good contrast ratio; and the orientation of liquid crystal molecules is prevented from being disturbed, providing a good display property.

As described above, according to the method for fabricating the liquid crystal display device having the counter source structure which can improve the production yield, the BM layer can have a sufficient light blocking property, providing a good contrast ratio. Moreover, according to the fabrication method of this example, the gaps between the colored portions are filled with the BM layer, flattening the color filter substrate without any protrusions of pattern edges of the BM layer formed on the surface of the color filter substrate. This prevents the orientation of liquid crystal molecules in the liquid crystal layer from being disturbed. As a result, the method of this example can fabricate a liquid crystal display device having an excellent display quality.

In particular, the transmittance of the BM layer made of a photosensitive resin can be reduced to 0.5% or less by setting the thickness of the BM layer at 400 nm or more. In this way, a liquid crystal display device having an excellent contrast ratio can be obtained.

Moreover, according to the fabrication method of this example, the BM layer having a desirable thickness can be formed by controlling the back surface light exposure. Therefore, a liquid crystal display device having an excellent display quality can be fabricated without increasing the number of fabrication steps and the fabrication cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device including a first substrate and a second substrate facing each other with a liquid crystal layer interposed therebetween, wherein the second substrate includes thereon: a plurality of pixel electrodes arranged in a matrix; a plurality of gate bus lines arranged in parallel with one another near the pixel electrodes; switching elements for selectively driving the pixel electrodes; and reference lines arranged in parallel with the gate bus lines for applying a reference potential to the switching elements, wherein the first substrate includes thereon: a color filter layer having colored portions of a plurality of colors arranged to correspond to pixel regions; and a plurality of source bus lines formed on the color filter layer to cross the gate bus lines, wherein a black matrix layer comprising a photosensitive resin material is formed to partly overlap and overlie the source bus lines and fill gaps between the colored portions, and a thickness of the black matrix layer overlapping the source bus lines is equal to or less than a thickness of the color filter layer, and wherein peripheries of the colored portions are tapered, and the black matrix layer partly overlaps the tapered peripheries.

2. A liquid crystal display device according to claim 1, wherein the thickness of the black matrix layer overlapping the source bus lines is 400 nm or more.

3. A liquid crystal display device according to claim 1, wherein a thickness of overlap portions of the black matrix layer and the tapered peripheries of the colored portions is equal to or less than a thickness of centers of the colored portions.

4. A liquid crystal display device comprising:

a first substrate and a second substrate facing each other with a liquid crystal layer interposed therebetween, wherein the second substrate includes thereon: a plurality of pixel electrodes arranged in a matrix; a plurality of gate bus lines arranged in parallel with one another near the pixel electrodes; switching elements for selectively driving the pixel electrodes; and reference lines arranged in parallel with the gate bus lines for applying a reference potential to the switching elements, wherein the first substrate includes thereon: a color filter layer having colored portions of a plurality of colors arranged to correspond to pixel regions; and a plurality of source bus lines formed on the color filter layer to cross the gate bus lines, wherein a black matrix layer comprising a photosensitive resin material is formed to partly overlap and overlie the source bus lines and fill gaps between the colored portions so that in at least one of said gaps a portion of one of said source lines is located between the first substrate and the black matrix layer, and a thickness of the black matrix layer overlapping the source bus lines is equal to or less than a thickness of the color filter layer, and wherein peripheries of the colored portions are tapered, and the black matrix layer at least partially overlaps at least some of the tapered peripheries.

* * * * *